United States Patent [19]
Murata

[11] Patent Number: 5,421,367
[45] Date of Patent: Jun. 6, 1995

[54] SPOOL TYPE VALVE
[75] Inventor: Shigeru Murata, Tokyo, Japan
[73] Assignee: Yamada T.S. Co., Ltd., Tokyo, Japan
[21] Appl. No.: 213,914
[22] Filed: Mar. 16, 1994
[30] Foreign Application Priority Data Jul. 29, 1993 [JP] Japan .................. 5-188398

[51] Int. Cl.⁶ ............... F15B 13/04; F16K 11/07
[52] U.S. Cl. ............... 137/625.69; 251/900; 277/165
[58] Field of Search ............ 137/625.69; 251/900; 277/165, 192, 199, 220, 221

[56] References Cited

U.S. PATENT DOCUMENTS

| | | |
|---|---|---|
| 3,115,701 | 12/1963 | Jones |
| 3,554,235 | 1/1971 | Opel et al. ............ 137/625.69 |
| 3,996,965 | 12/1976 | Peters ............... 137/625.66 |
| 4,646,785 | 3/1987 | Ruedle et al. ........ 137/625.69 X |
| 4,876,857 | 10/1989 | Feltz et al. |
| 4,986,168 | 1/1991 | Geffroy et al. ........ 277/199 X |
| 5,095,949 | 3/1992 | Day ................. 137/625.69 |

FOREIGN PATENT DOCUMENTS

| | | |
|---|---|---|
| 0356185 | 2/1990 | European Pat. Off. |
| 2108705 | 8/1972 | Germany ............ 137/625.69 |
| 2663443 | 1/1978 | Germany ............ 137/625.69 |
| 8626721 | 5/1988 | Germany . |
| 438955 | 6/1967 | Switzerland . |

OTHER PUBLICATIONS

Communication from EP for corresponding European patent application-European Search Report (Dec. 7, 1994).
Abstract for Sliding Valve for Carburetor, vol. 13, No. 143 (M-811) 7 Apr. 1989 & JP-A-63 306 265 (Asahi Glass) 14 Dec. 1988.

*Primary Examiner*—Gerald A. Michalsky
*Attorney, Agent, or Firm*—Biebel & French

[57] ABSTRACT

A spool type valve for minimizing degradation in sealing ability is provided. The spool type valve comprises a spool 30 having land portions 36A-36E. The spool is inserted into a sleeve 20 for slidable movement along the axis thereof so as to define a plurality of fluid passages 23, 24 in the sleeve. The spool controllably opens and closes ports 21A-21E of the sleeve. Each land portion includes a slider member 38 and an O-ring 37. The slider member is divided into plural elements and is in slidable engagement with the inner wall 22 of the sleeve. The O-ring is adapted to resiliently urge the slider member against the inner wall of the sleeve. The slider member includes an annular groove 39B into which the O-ring 37 is fitted.

4 Claims, 8 Drawing Sheets

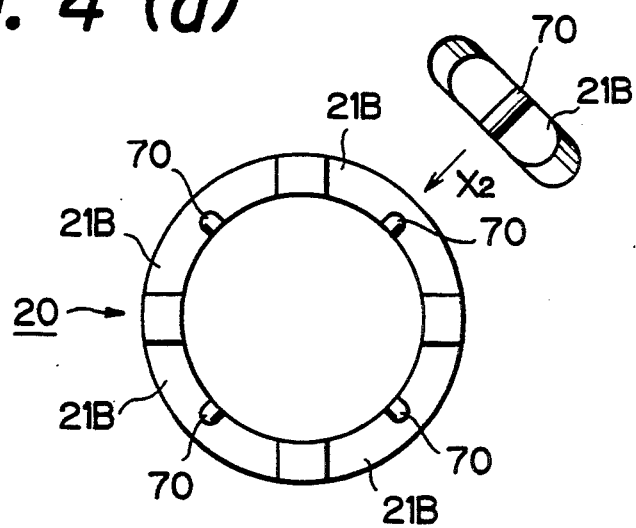

SPOOL TYPE VALVE

BACKGROUND OF THE INVENTION

1. Field of the Invention

This invention relates to an improvement of a spool type valve. More particularly, the invention relates to a spool type valve including a sleeve and a spool wherein the spool is received in the sleeve for slidable movement along the axis of the sleeve so as to open and close a port of the sleeve for the purpose of fluid control.

2. Prior Art

A spool type valve is conventionally known in the art which comprises a sleeve having a plurality of ports spaced apart along the axis thereof, and a spool having integral land portions for controllably opening and closing the ports of the sleeve. The spool is inserted into the sleeve for slidable movement along the axis thereof so as to define plural fluid passages in the sleeve. Such a spool type valve is used for the purpose of fluid control.

One prior art spool type valve employs an O-ring as a sealing member on the land. The O-ring is in slidable contact with the inner wall of the sleeve so as to seal the fluid passages.

It is noted, however, that the above spool type valve is designed so that the O-ring is slidably engaged directly with the inner wall of the sleeve. Accordingly, the O-ring tends to undesirably deform due to foreign material contained in oil or air, such as dust, powder caused from abrasion, for example, so that sealing ability is degraded during repetitive use of the spool type valve. It is also noted that immigration of foreign material into a space between the O-ring and the spool may cause undesirable lift-up of the O-ring.

SUMMARY OF THE INVENTION

Under the circumstances, the present invention is aimed at to provision of a spool type valve which can minimize degradation in sealing ability during use.

In order to achieve the above object, the invention provides a spool valve comprising a spool having a land portion, the spool being inserted into a sleeve for slidable movement along the axis thereof so as to define a plurality of fluid passages in the sleeve, whereby controllably opening and closing a port of the sleeve, the land portion including a slider member and an O-ring, the slider member being divided into plural elements and being in slidable engagement with the inner wall of the sleeve, the O-ring adapted to resiliently urge the slider member against the inner wall of the sleeve, the slider member having an annular groove into which the O-ring is fitted.

The slider member is urged against the inner wall of the sleeve by means of resiliency of the O-ring. The O-ring is prevented from wearing, since the O-ring is not in slidable engagement directly with the inner wall of the sleeve. The O-ring is protectively received within the annular groove of the slider member, so that swelling of the O-ring due to fluids such as oil, and deformation of the O-ring due to foreign material may be prevented. Even when the slider member is worn out during repetitive use of the spool type valve, such worn-out amount may be compensated by means of the resiliency of the O-ring. Thus, degradation in sealing ability during use may be restricted.

The present invention also provides a spool type valve comprising a sleeve having a plurality of ports spaced apart along the axis of the sleeve, the ports being controllably opened and closed by a spool having a land portion to define plural fluid passages in the sleeve, the ports including a rib extending in parallel with the axis of the spool, the ribs urging the land portion.

When the land portion is position at the port, the land portion is urged against the port by means of the ribs. Thus, lift-up of the slider member may be prevented when the land portion consists of plural slider elements.

When the sleeve is injection molded from a polyphenylene sulfide resin, and the slider member is injection molded from aromatic polyester, wear of the sleeve and the slider member is minimized, so as to increase sealing ability.

BRIEF DESCRIPTION OF THE DRAWINGS

A spool type valve according to the invention, when applied to a diaphragm pump, will be explained in detail below with reference to the attached drawings in which:

FIG. 4(a) is a sectional view along line B—B in FIG. 2;

FIG. 4(b) is a fragmentary view of the sleeve shown in FIG. 4(a) illustrating a port portion thereof when viewed in the direction of arrow mark X2;

DETAILED DESCRIPTION OF THE PREFERRED EMBODIMENTS

Figure 1:
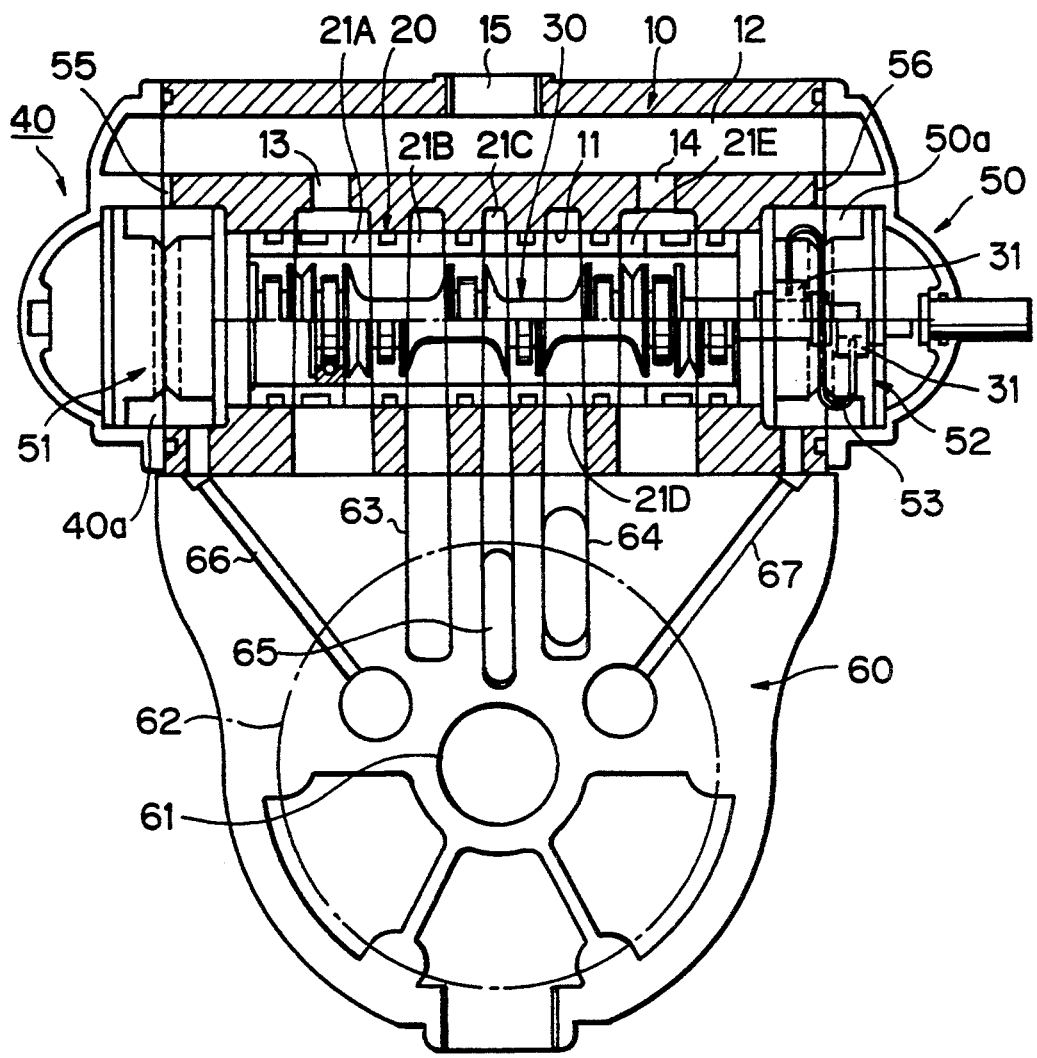
FIG. 1 is a sectional view schematically illustrating the construction of a diaphragm pump to which a spool type valve according to the invention is mounted.

FIG. 1 is a sectional view schematically illustrating a diaphragm pump to which a spool type valve according to the invention is mounted.

In FIG. 1, reference characters 10, 20, 30, 40 and 50, and 60 respectively designate a cylinder block, a sleeve, a spool, cover members, and a body partly constituting a diaphragm pump. The body 60 is connected to two air chambers (not shown). A slidable shaft 61 is provided in the body at the central portion thereof. The slidable shaft 61 extends through the air chambers. The slidable shaft 61 is provided, at the opposite ends thereof, with diaphragm devices. The diaphragm devices 62 define an air chamber and a pump chamber in a chamber means (not shown). The constituent elements of the diaphragm pump 60 are well known in the art, and hence detailed explanation therefor will be omitted.

In the illustrated embodiment, the spool type valve is used to drive the two diaphragm devices 62. The cylinder block 10 partly constituting the spool type valve is secured to the body 60.

The cover members 40 and 50 are attached to the opposite ends of the cylinder block 10, respectively, by means of fastener members (not shown). The opposite ends of the cylinder block 10 and the cover members 40 and 50 respectively cooperate to define receiving chambers 40a and 50a therebetween. Sleeve fixation members 51 and 52 are received in the receiving chambers 40a and 50a, respectively. The sleeve fixation member 52 is provided with a spring 53. The spring 53 is used to stabilize the movement of the spool 30.

The cylinder block 10 includes a pressure chamber 11 consisting of a through bore of a circular cross-section, an air supply chamber 12, and communication passages 13, 14 and 15. The air supply chamber 12 and the pressure chamber 11 are communicated with each other through the communication passages 13 and 14. The air supply chamber 12 and the receiving chambers 40a and 50a are respectively communicated through gaps 55 and 56, respectively. The communication passage 15 is connected to an air supply tank through a conduit (not shown).

The sleeve 20 and the spool 30 both are formed by injection molding. The sleeve 20 and the spool 30 are injection molded from polyphenylene sulfide (available from Phillips Petroleum under the trade name of "Ryton PPS").

Figure 2:
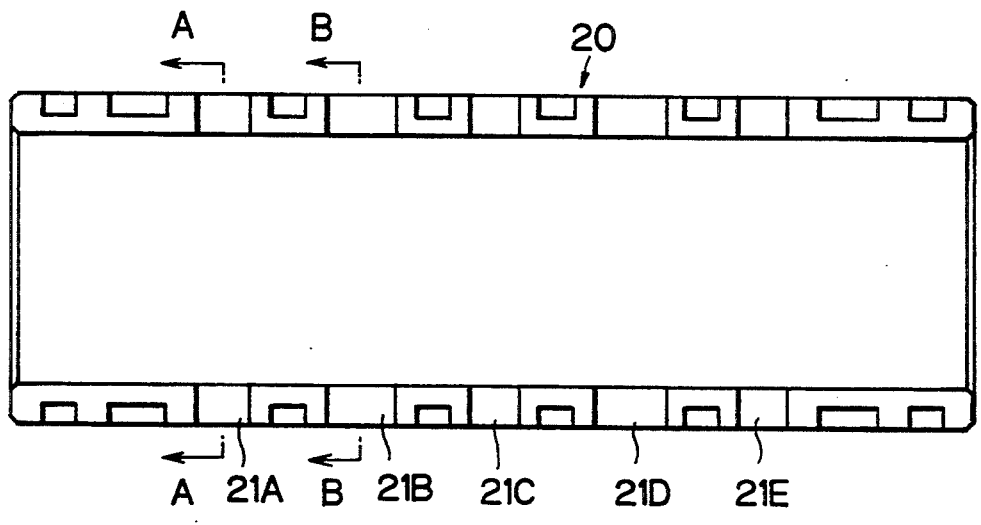
FIG. 2 is a longitudinal sectional view of a sleeve shown in FIG. 1.
Figure 3:
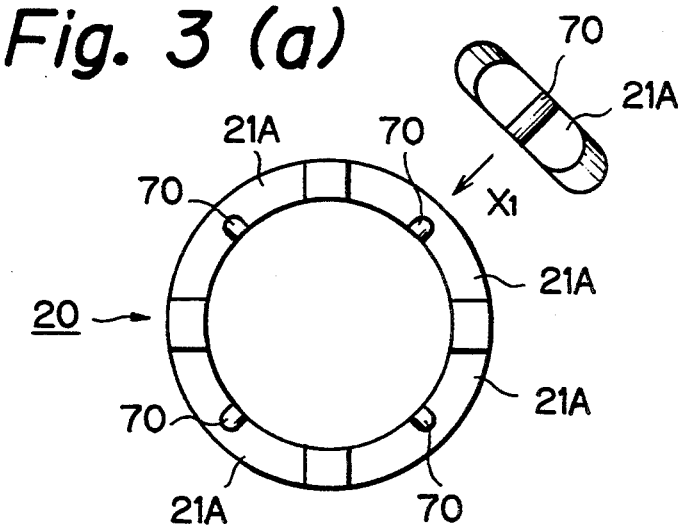
FIG. 3(a) is a sectional view along line A—A of FIG. 2.
FIG. 3(b) is a fragmentary view of the sleeve shown in FIG. 3(a) illustrating a port portion thereof when viewed in the direction of arrow mark X1.

The sleeve 20 is fitted into the cylinder block 10 and fixed in position by means of the cover members 40 and 50, and the sleeve fixation members 51 and 52. The sleeve 20 includes, as shown in FIG. 2, a plurality of ports 21A–21E spaced apart along the axis of the sleeve. The ports 21A–21E are formed at every 90 degrees in the circumferential direction of the sleeve 20, as shown in FIG. 3(a) and FIG. 4(a). The ports 21A and 21E are provided for pressurization, and serve as inlet/outlet passages for air as will be explained below. The ports 21B and 21D are connected to conduits 63 and 64, respectively. The conduits 63 and 64 serve to direct air as a working fluid into the body 60. The port 21C is connected to a conduit 65 which serves to discharge air as a working fluid. The port 21A is aligned with the communication passage 13 and the port 21E is aligned with the communication passage 14, as shown in FIG. 1.

Figure 5A:
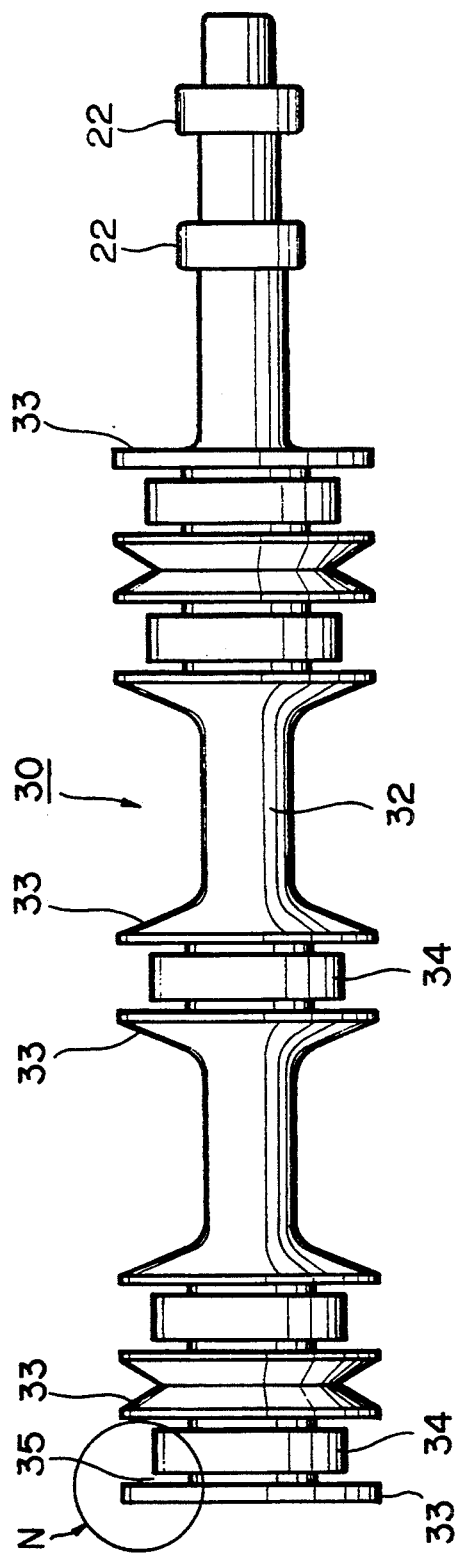
FIG. 5(a) is a side elevational view of a spool to be inserted into the sleeve shown in FIG. 2, with a slider member being omitted.

The spool 30 includes, as shown in FIG. 5(a), a pair of protrusions 31 and 31 at one end thereof. The opposite ends of the spring 53 are secured to the protrusions 31 and 31, respectively. A shaft portion 32 of the spool 30 is provided, at its predetermined positions, with a plural pairs of larger flanges 33 having a diameter larger than that of the shaft portion 32. A smaller flange 34 is disposed between each pair of larger flanges 33. The smaller flanges 34 have a diameter larger than that of the shaft portion 32 but smaller than that of the larger flanges 33.

Figure 5B:
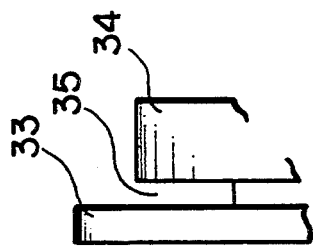
FIG. 5(b) is a sectional view illustrating the portion indicated by reference character N in FIG. 5(a)

An annular space 35 is provided between each of the larger flanges 33 and each of the smaller flanges 34. The annular spaces 35 serve as so-called "sink prevention" during manufacturer of the spool by means of injection molding. In FIG. 5(b), the portion indicated by reference character N in FIG. 5(a) is shown in an enlarged scale in order to exaggeratedly show one example of the annular space 35. It is to be noted that the left-handmost larger flange 33 and the right-handmost larger flange 33 shown in FIG. 5(a) serve as end walls.

Figure 6:
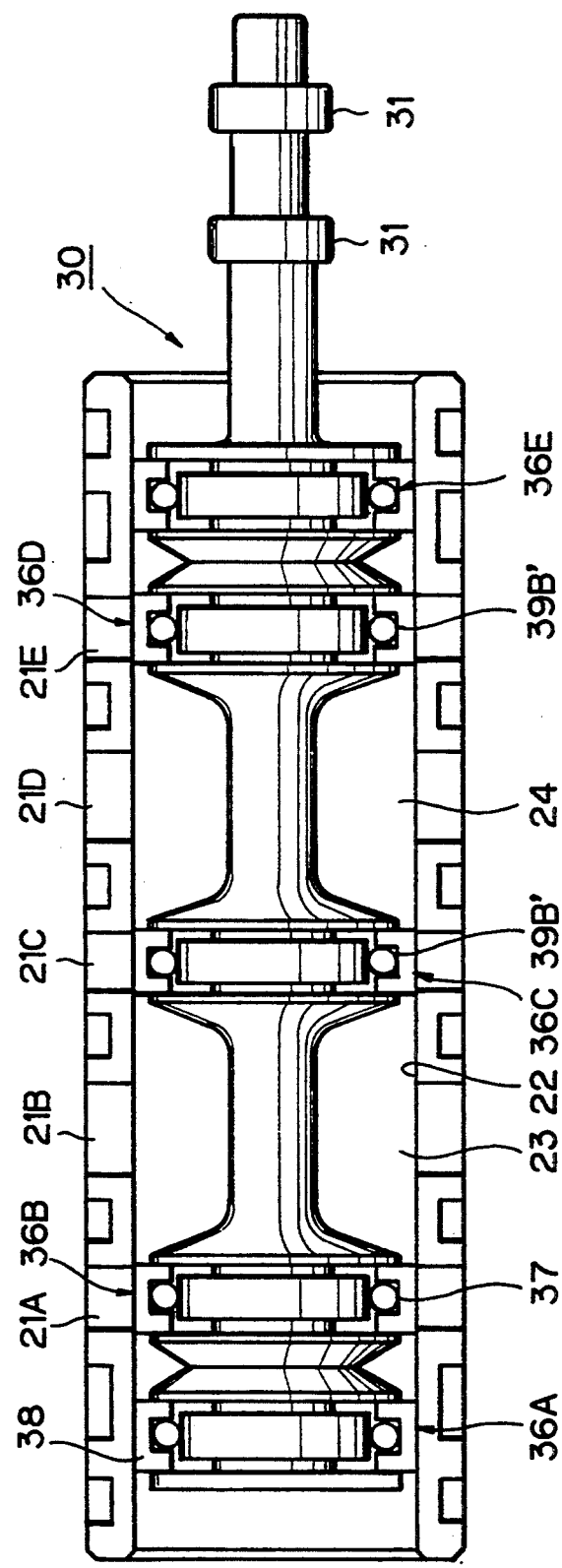
FIG. 6 is a sectional view illustrating the spool type valve according to the invention in its neutral position.
Figure 7:
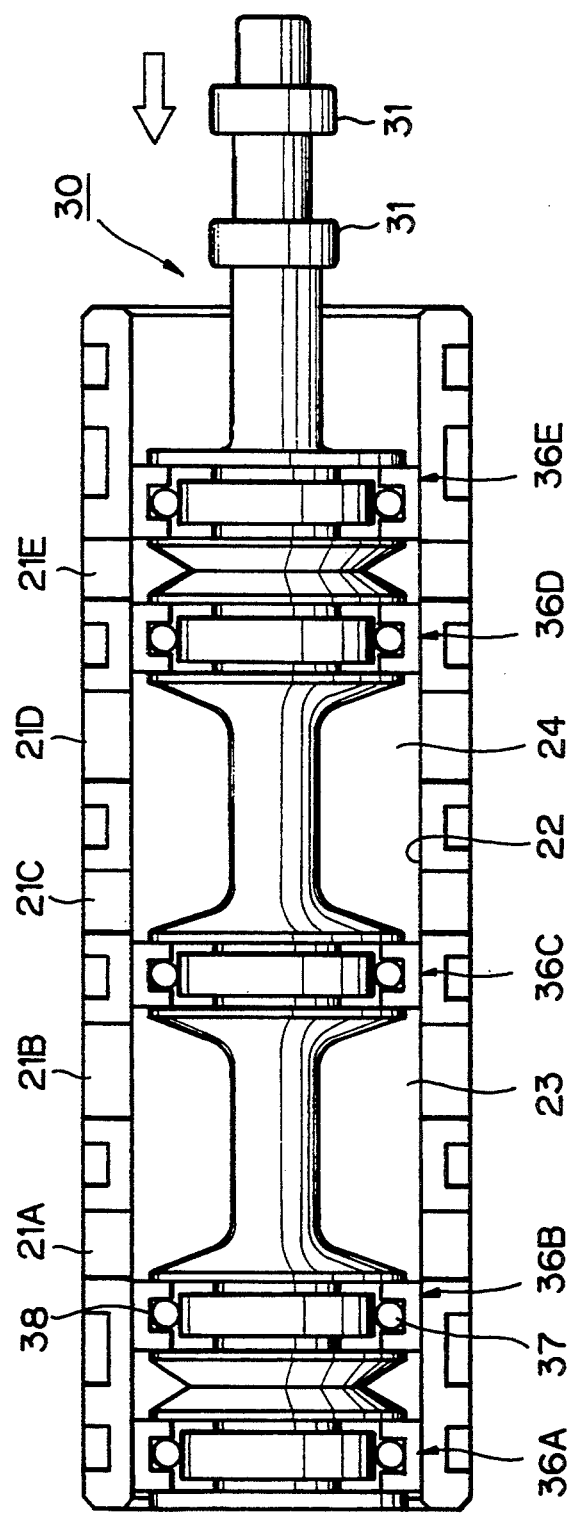
FIG. 7 is a sectional view illustrating the spool type valve according to the invention in its position movable to the left.
Figure 8:
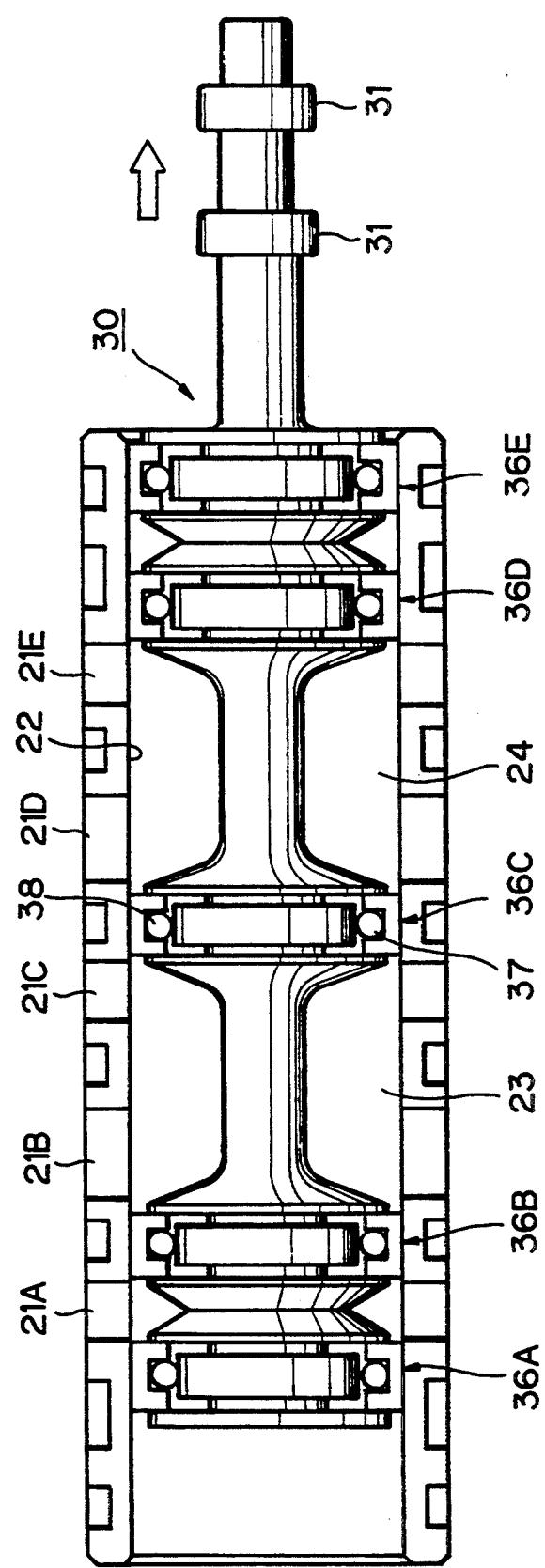
FIG. 8 is a sectional view illustrating the spool type valve according to the invention in its position movable to the right.

Land portions 36A–36E are provided for each pair of larger flanges 33 and the smaller flange 34 therebetween, as shown in FIGS. 6 to 8. Each of the land portions 36A–36E includes an O-ring 37 and an annular slider member 38. The O-ring 37 is fitted over the smaller flange 34. The slider member 38 consists of a plurality of slider elements 39. The slider elements 39 have a configuration which is obtained by evenly dividing the slider member into an identical shape, as shown in FIGS. 9(a)–9(d). The slider elements are injection molded from aromatic polyester such as Oxybenzoyl Polyester (POB; available from Sumitomo Chemicals under the trade name of "Ekonole"). In the illustrated embodiment, the slider member 38 consists of three identical slider elements 39.

Figure 9:
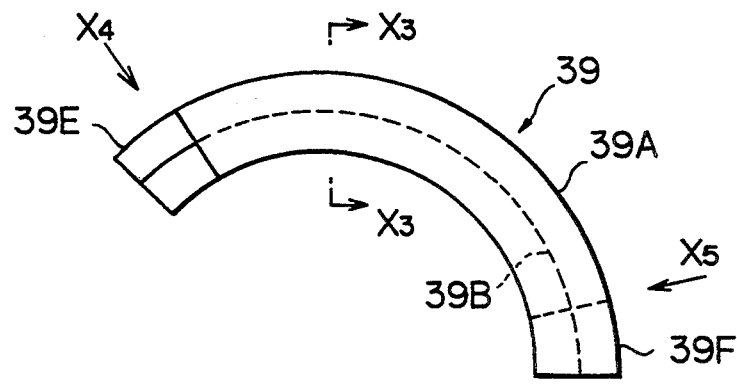
FIG. 9(a) is a front view illustrating elements constituting the slider member according to the invention.
FIG. 9(b) is a sectional view along line X3—X3 in FIG. 9(a)
FIG. 9(c) is an end view of the elements constituting the slider member when viewed in the direction of arrow mark X4 in FIG. 9(a)
FIG. 9(d) is an end view of the elements constituting the slider member when viewed in the direction of arrow mark X5 in FIG. 9(a).
Figure 9:
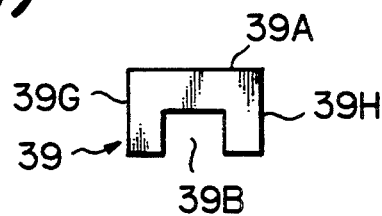
Figure 9:
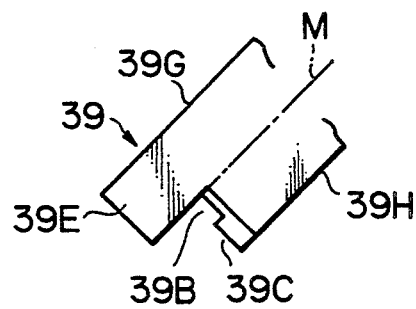
Figure 9:
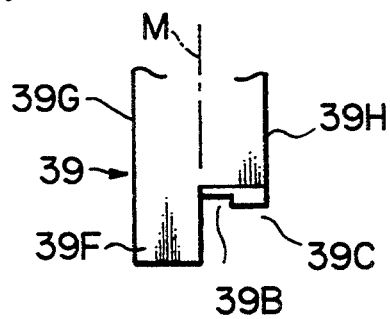

The slider elements 39 are of an arcuate configuration. The outer periphery of each of the slider elements 39 provides a surface 39A in slidable contact with the inner wall of the sleeve 22. The slider element 39 is formed, in the inner periphery thereof, with an arcuate inner groove 39B, as shown in FIGS. 9(a) and 9(b). The slider element 39 is formed, at the opposite ends thereof, with notches 39C and 39C and butt protrusions 39E, 39F, as shown in FIGS. 9(c) and 9(d). The protrusion 39E and the protrusion 39F are oppositely disposed with respect to a line M extending the center of the thickness of the slider element 39 (see FIGS. 9(c) and 9(d)).

The O-ring 37 is engaged into the inner groove 39B of the slider element 39. The slider member 38 is formed by combining the three slider elements 39 with the respective protrusions 39E being arranged in opposite relationship with the respective protrusions 39F. The O-ring 37 is covered by an annular groove of the slider member formed by the inner grooves 39B of the slider elements. That is to say, the O-ring 37 is protected, by means of the wall 39G, 39H defining the inner grooves 39B of the slider elements 39, against deformation due to possible foreign materials or powder (caused from abrasion) in a working fluid, against swelling due to the working fluid, and against lift-up due to foreign material getting into between the smaller flange 34 and the O-ring 37. Thus, the O-ring 37 is prevented from degradation. Foreign material, powders resulting from abrasion, or the like contained in a working fluid is directed into the annular space 35, so as to avoid abrasive contact between the surface 39A of the slider element 39 and the inner wall 22 of the sleeve 20.

The slider elements 39 are held by the O-ring 37. The slider elements are resiliently biassed in opposite direction along the thickness thereof by means of a resiliency of the O-ring 37, so as to be received between the larger flanges 33. By this, the slider elements 39 are securely attached to the smaller flange 34. The slider elements 39 are also resiliently urged in the radially outward direction by means of the O-ring 37. Thus, the surface 39A is urged against the inner wall 22 of the sleeve. The spool 30 is inserted into the sleeve 20 for slidable movement along the axial direction thereof. Two fluid passages 23, 24 are defined within the sleeve 20 by means of land portions 36B-36D.

The sleeve 20 is formed, in each port 21A-21E, with a rib 70 for urging each slider element 39. Each of the ribs 70 extends in parallel with the axis of the spool 30. The ribs 70 prevent lift-up of each slider element 39 when the slider elements 39 are located in a position to cover the respective ports 21A-21E. The ribs 70 also serve to hold the slider elements 39 at more than 2 points so as to apply substantially the same amount of load to the opposite ends and central portion of the slider elements 39 during slidable movement thereof. This contributes to prevention of uneven wear of the slider elements 39.

When the spool type valve is in a position shown in FIG. 6, the exhaust port 21C, and the pressure port 21A, 21E of the diaphragm pump are all closed.

When the spool type valve is in a position shown in FIG. 7 with the central land portion 36C being to the left of the exhaust port 21C, the air from the air supply chamber 12 is directed through the pressure port 21A, the air supply passage 23, and the conduit 63 to one of the air chambers of the two diaphragm devices 62. By this, the slidable shaft 61 is moved downwardly in the direction of the thickness of the sheet of FIG. 1. It is to be noted that the air in the air supply chamber 12 is directed through the gaps 55, 56, the receiving chambers 40a, 50a, and the conduits 66, 67 to a pilot valve (not shown) of the above one air chamber and to a pilot valve (not shown) of the air chamber of the other diaphragm device 62, so as to maintain the pressure therein. The air in the other air chamber is exhausted through the conduit 64, the air supply passage 24, and the conduit 65.

As the slidable shaft 61 moves downwardly in the direction of the thickness of the sheet of FIG. 1, the pilot valve of the other air chamber is opened by means of a center disc (not shown). Thus, the pressure in the receiving chamber 50a and the pressure in the pilot valve of the other chamber are decreased, so that the spool 30 is changed-over toward the right. In this state, the central land portion 36C is located to the right of the exhaust port 21C, as shown in FIG. 8.

Then, the air from the air supply chamber 12 is directed through the pressure port 21E, the air supply passage 24, and the conduit 64 to the other air chamber of the diaphragm pump, so that the slidable shaft 61 is moved upwardly in the direction of the thickness of the sheet of FIG. 1. It is noted that the air in the air supply chamber 12 is directed through the gaps 55, 56, the receiving chambers 40a, 50a, and conduits 66, 67 to the pilot valve of the one air chamber of the diaphragm pump and to the pilot valve of the other air chamber, so as to maintain the pressure therein. The air in the one air chamber is exhausted through the conduit 63, the air supply passage 23, and the conduit 65.

As the slidable shaft 61 is moved upwardly in the direction of the thickness of the sheet of FIG. 1, the pilot valve of the one air chamber is opened by means of the center disc (not shown). Thus, the pressure in the receiving chamber 40a and the pressure in the pilot valve of the one chamber are decreased, so that the spool 30 is changed-over to the left. In this state, the central land portion 36C is located to the left of the exhaust port 21C.

The invention having the above construction provides several advantages mentioned below.

Since the O-ring is not constructed to be in slidable, pressure contact directly with the inner wall of the sleeve, it is possible to prevent the O-ring from wear. Since the O-ring is protectively fitted within the annular groove of the slider member, it is possible to prevent the O-ring from deforming due to the working fluid or foreign material contained therein. Even when the slider member wears due to the repetitive use of the spool type valve, the worn-out amount may be compensated by means of the resilient biassing force from the O-ring, so that degradation in sealing ability may be restricted.

What is claimed is:

1. A spool type valve comprising a spool having a land portion, said spool being inserted into a sleeve for slidable movement along the axis thereof so as to define a plurality of fluid passages in said sleeve, whereby controllably opening and closing a port of said sleeve, wherein characterized by that:

said land portion includes a slider member and an O-ring, said slider member being divided into plural slider elements and being in slidable engagement with the inner wall of said sleeve, said O-ring adapted to resiliently urge said slider member against said inner wall of said sleeve, said slider member having an annular groove into which said O-ring is fitted;

said spool is formed, by means of injection molding, with a shaft portion, a smaller flange for engagement with said O-ring, and a larger flange;

said land portion is formed by fitting said O-ring over said smaller flange and by fitting said slider member over said O-ring; and said sleeve having a plurality of ports spaced apart along the axis of said sleeve, said ports being controllably opened and closed by said spool having said land portion to define plural fluid passages in said sleeve, wherein each said port includes a rib extending in parallel with the axis of said spool, said ribs urging said land portion, and wherein said sleeve is formed by means of injection molding.

2. A spool type valve according to claim 1, wherein said spool is formed from a polyphenylene sulfide resin.

3. A spool type valve according to claim 1, wherein said slider member is formed from an aromatic polyester resin.

4. A spool type valve according to claim 1, wherein each said rib extends across a respective port.

* * * * *